（12） United States Patent
Masuo et al.

(10) Patent No.: US 7,969,109 B2
(45) Date of Patent: Jun. 28, 2011

(54) ELECTRICAL ACTUATOR

(75) Inventors: Shuzo Masuo, Komaki (JP); Tsuyoshi Kanada, Komaki (JP)

(73) Assignee: CKD Corporation, Komaki-shi, Aichi (JP)

( * ) Notice: Subject to any disclaimer, the term of this patent is extended or adjusted under 35 U.S.C. 154(b) by 422 days.

(21) Appl. No.: 12/336,152

(22) Filed: Dec. 16, 2008

(65) Prior Publication Data

US 2009/0167214 A1 Jul. 2, 2009

(30) Foreign Application Priority Data

Dec. 28, 2007 (JP) .................................. 2007-339222

(51) Int. Cl.
*H02K 23/00* (2006.01)
*H02K 37/00* (2006.01)
(52) U.S. Cl. ...................... 318/437; 318/135; 303/113.2; 303/113.3
(58) Field of Classification Search .................... 318/14, 318/590, 266, 466, 437, 135; 303/113.2, 303/113.3
See application file for complete search history.

(56) References Cited

U.S. PATENT DOCUMENTS

| 4,938,543 A | * | 7/1990 | Parker et al. ............... 303/113.2 |
| 5,029,950 A | * | 7/1991 | Vennemeyer et al. ...... 303/113.2 |
| 5,333,989 A | | 8/1994 | Missana et al. |
| 2009/0055056 A1 | | 2/2009 | Ooki et al. |

FOREIGN PATENT DOCUMENTS

| EP | 0583864 A1 | 2/1994 |
| GB | 2293252 A | 3/1996 |
| JP | 2000092811 A | 3/2000 |
| JP | 2007-205032 A | 8/2007 |

* cited by examiner

*Primary Examiner* — Paul Ip
(74) *Attorney, Agent, or Firm* — Marsh Fischmann & Breyfogle LLP (57) ABSTRACT

An electric actuator includes a motion conversion mechanism and a position detector. The motion conversion mechanism converts rotation of a rotary shaft of a motor into linear motion of an output shaft. The position detector detects a permanent magnet M, which moves integrally with the output shaft. A motor control portion controls the motor based on commands from a host command unit. A control program for controlling the motor includes, as control modes, six fluid pressure cylinder modes, according to which the motor is controlled. Specifically, each of the control modes corresponds to one of the cases where the fluid pressure cylinder is controlled by three solenoid valves, or a two-position single solenoid valve, a two-position double solenoid valve, and a three-position double solenoid valve. The motor is controlled according to the selected control mode.

10 Claims, 3 Drawing Sheets

ELECTRICAL ACTUATOR

BACKGROUND OF THE INVENTION

The present invention relates to an electric actuator, and more particularly, to an electric actuator that can be used in place of a fluid pressure cylinder that is a part of an automated machine.

In automated machines such as machine tools and packaging machines, pneumatic cylinders are widely used to move an object or to apply pressing force to an object to hold it, or example, against a wall surface. However, the efficiency of a compressor producing compressed air for driving a pneumatic cylinder is relatively poor. In terms of the total amount of used energy, the use of electricity as the drive source consumes less energy than the case where a pneumatic cylinder is used. Accordingly, electric actuators have been used, in which an electric motor is used in place of a pneumatic cylinder. Specifically, rotation of the electric motor is converted into a linear motion to cause an output shaft to reciprocate linearly.

In an electric actuator, rotation of a motor (output shaft) is detected with a rotary encoder, and the displacement and the moving velocity of the output shaft can be determined based on detection signals from the rotary encoder. It is thus possible to perform feedback control using detection signals of the rotary encoder. Compared to a pneumatic cylinder, the displacement and the velocity of the output shaft of an electric actuator are more flexibly controlled. An electric actuator is controlled by performing feedback control on the rotation amount and rotation speed of the motor. The control of an electric actuator is thus different from the control of a pneumatic cylinder, in which the displacement of a piston rod is controlled through ON/OFF control using an electromagnetic valve. Therefore, when using an electric actuator in place of a pneumatic cylinder, a control method that is different from that of a pneumatic cylinder is required.

Conventionally, a linear actuator has been known that includes a motor having a motor drive circuit controlling the motor power, an encoder for detecting the rotation position of the motor, a motor control circuit that performs closed-loop control on the motor based on commands from a host command unit, and a motion converting mechanism that converts rotation of the motor output shaft into linear motion. Prescribed operations of the motor include positioning of the linear actuator, control of the velocity of an end effecter, control of thrust of the end effecter, and combinations of the listed operations. In response to commands from a host command unit such as a personal computer (hereinafter, referred to as a PC) or a programmable logic controller (hereinafter, referred to as a PLC), the motor control circuit executes a single operation command or a command that has been taught and memorized in advance.

The linear actuator disclosed in Japanese Laid-Open Patent Publication No. 2000-92811 is capable of performing single operation commands or previously taught and memorized commands based on commands from a host command unit. In order to control a pneumatic cylinder, three types of electromagnetic valves, namely a two-position single solenoid valve, a two-position double solenoid valve, and a three-position double solenoid valve are selectively used in combination depending on the operation pattern. Even if a command signal from the host command unit is the same, the operation of the pneumatic cylinder differs depending on the type of the used electromagnetic valve.

For example, in the case of a two-position single solenoid valve, and there is one input channel from a host command unit, while an ON signal is supplied from the host command unit, the piston is moved away from a home position (reference position). When the supply of the ON signal is stopped, the piston is returned to the home position.

In the case of a two-position double solenoid valve or a three-position double solenoid valve, there are two input channels from a host command unit. In a two-position double solenoid valve, when a signal through the first input channel from the host command unit is turned ON with the piston at the home position, the piston is moved away from the home position (reference position), and this motion continues even if the signal through the first input channel is turned OFF. After the piston reaches a target position, when a signal through the second input channel is turned ON, the piston is moved toward the home position. This motion continues even if the signal through the second input is turned OFF. That is, the piston does not stop at any intermediate position.

In the case of a three-position double solenoid valve, when a signal through the first input channel from the host command unit is turned ON with the piston at the home position, the piston is moved away from the home position (reference position), and the piston is stopped when the signal through first input channel is turned OFF. When a signal through the second input channel from the host command unit is turned ON with the piston at a position away from the home position, the piston is moved toward the home position, and the piston is stopped when the signal through the second input channel is turned OFF. That is, the piston stops at an intermediate position.

Therefore, in order to control a linear actuator (electric actuator) using a control circuit designed to control a pneumatic cylinder without modification, programs need to be taught to the motor control circuit of the linear actuator in correspondence with each of these electromagnetic valves. The replacement is thus troublesome. Japanese Laid-Open Patent Publication No. 2000-92811 gives no consideration to the relationship with types of electromagnetic valves designed to control pneumatic cylinders.

BRIEF SUMMARY OF THE INVENTION

Accordingly, it is a first objective of the present invention to provide an electric actuator that, when used in place of a fluid pressure cylinder, can be controlled through a control program of a host control unit that is the same as a control program designed to control a fluid pressure cylinder. Further, a second objective of the present invention is to provide an electric actuator in which the same position detector as that used in a fluid pressure cylinder can be used.

To achieve the first objective of the present invention and in accordance with a first aspect of the present invention, an electric actuator that has a main body and can be used in place of a fluid pressure cylinder that is a part of an automated machine is provided. The fluid pressure cylinder has a piston rod, reciprocation of which is controlled through an electromagnetic valve. The electric actuator includes a movable body, a motor having a rotary shaft, a motion conversion mechanism, a motor control circuit, and a memory. The movable body can be moved linearly, and corresponds to the piston rod of the fluid pressure cylinder. The motion conversion mechanism converts rotation of the rotary shaft of the motor to linear motion of the movable body. The motor control circuit controls the motor. The memory stores a control program for controlling the motor control circuit. The control program has, as a control mode for controlling the motor, a fluid pressure cylinder mode, in which the electric actuator actuates the movable body in a manner corresponding to the manner in which the piston rod is actuated when the fluid pressure cylinder is controlled through the electromagnetic valve. The motor control circuit controls the actuation and stopping of the movable body in the fluid pressure cylinder mode.

A fluid pressure cylinder uses an electromagnetic valve to supply and drain pressure fluid. Thus, even if the same fluid pressure cylinder is used, command signals from the host command unit differ depending on the type of the electromagnetic valve or the use mode (transport mode or press mode). Also, even if the same command signal is supplied, the operation may be different. Therefore, when an electric actuator is used in place of a fluid pressure cylinder, the method for controlling the movement of the output shaft, or the motor, is different depending on the type and the use mode of the electromagnetic valve used for controlling the fluid pressure cylinder. According to this invention, the control program for controlling the motor control circuit mounted on the electric actuator includes a fluid pressure cylinder mode, which corresponds to an operation mode for controlling a fluid pressure cylinder using an electromagnetic valve. The motor control circuit controls the actuation and stopping of the movable body in the fluid pressure cylinder mode. Selecting and using of the use mode designed for the fluid pressure cylinder and the mode corresponding to the electromagnetic valve allows the same program to be used as a control program of the host command unit used for controlling the fluid pressure cylinder. Compared to the prior art electric actuator, the replacement is easy.

In order to achieve the second objective, the movable body preferably has a detection portion that moves integrally with the movable body, and the main body of the electric actuator preferably has an attaching portion to which a position detector for detecting the detection portion is attached. In this case, the host command unit is capable of detecting the position of the movable body by the use of the position detector attached to the electric actuator, which position detector is the same as that used in a fluid pressure cylinder.

The fluid pressure cylinder mode of the control program is preferably divided into total of six different modes including a transport mode for moving an object and a press mode for applying pressing force to an object to hold it, and each of the transport mode and the press mode is preferably divided into three modes each corresponding to one of the cases where a fluid pressure cylinder is controlled with a two-position single solenoid valve, a two-position double solenoid valve, and a three-position double solenoid valve. The motor control circuit controls the motor in a selected one of the six modes. In this case, the control program that controls the motor control circuit mounted on the electric actuator has six control modes, which correspond to the use modes and the types of the electromagnetic valve of the fluid pressure cylinder. Selecting and using of the use mode designed for the fluid pressure cylinder and the mode corresponding to the electromagnetic valve allows the same program to be used as a control program of the host command unit used for controlling the fluid pressure cylinder. Compared to the prior art electric actuator, the replacement is easy.

When controlling the motor in the transport mode, the motor control circuit is preferably capable of changing the moving velocity, the acceleration, and a target moving distance of the movable body, and when controlling the motor in the press mode, the motor control circuit is preferably capable of changing the torque, the position at which the torque reduction starts, and a target moving distance. The moving velocity and acceleration of the piston rod of a fluid pressure cylinder are adjusted by means of a speed controller. Such an adjustment is easily performed by simply changing the control conditions of the motor.

The electric actuator preferably includes a rotation detector that detects rotation of the rotary shaft of the motor, and the control program further preferably has an electric motor mode, in which the motor is controlled based on a command signal from a host command unit and a detection signal of the rotation detector. The motor control circuit controls the motor in a selected one of the fluid pressure cylinder mode and the electric motor mode. In this case, the electric actuator can be controlled not only at the control mode of a fluid pressure cylinder, but also at the control mode of a conventional electric actuator. This adds to the flexibility of the use of the electric actuator.

The control program is preferably configured to control the motor such that, when the motor is being controlled in the fluid pressure cylinder mode, the motor is stopped and returns the movable body to a home position based on an emergency stop command and a home position return command from a host command unit. When a fluid pressure cylinder is used, there is a demand for stopping the piston rod at the current position regardless of the type of the control valve. Also, there is a demand for actuating the piston rod after returning the piston rod to the home position after the emergency stop. The present invention facilitates emergency stop and returning to the home position, which can be difficult depending on the type of electromagnetic valve in the control of a fluid pressure cylinder.

The movable body is preferably installed in a control valve that selectively stops and allows flow of fluid, and the motor control circuit is preferably capable of changing the opening and closing speed of the control valve. In this case, the opening and closing speed of the fluid control valve that opens, closes, and blocks a passage can be adjusted. In this case, a flow control valve can be driven by the electric actuator.

According to the present invention, when used in place of a fluid pressure cylinder, a control program of the host control unit that is the same as a control program for controlling a fluid pressure cylinder can be used. Also, the same position detector as that in the case of the fluid pressure cylinder can be used.

In accordance with a second aspect of the present invention, an electric actuator control system including the electric actuator according to the first aspect of the present invention, a position detector attached to the electric actuator, and a host command unit electrically connected to the electric actuator and to the position detector is provided. The electric actuator further includes a rotation detector that detects rotation of the rotary shaft of the motor. The control program further has an electric motor mode, in which the motor is controlled based on a command signal from the host command unit and a detection signal of the rotation detector. The motor control circuit controls the motor in a selected one of the fluid pressure cylinder mode and the electric motor mode. The host command unit determines whether there is an abnormality in the electric actuator based on an output signal of the rotation detector. The control program is configured to control the motor such that, when the motor is being controlled in the fluid pressure cylinder mode, the motor is stopped and returns the movable body to a home position based on an emergency stop command and a home position return command from the host command unit.

In accordance with a third aspect of the present invention, an electric actuator control system including the electric actuator according to the first aspect of the present invention, and a host command unit that outputs a control signal to the electric actuator based on a control program for controlling a fluid pressure cylinder is provided.

Other aspects and advantages of the present invention will become apparent from the following description, taken in conjunction with the accompanying drawings, illustrating by way of example the principles of the invention.

BRIEF DESCRIPTION OF THE SEVERAL VIEWS OF THE DRAWINGS

The invention, together with objects and advantages thereof, may best be understood by reference to the following description of the presently preferred embodiments together with the accompanying drawings in which.

DETAILED DESCRIPTION OF THE INVENTION

An electric actuator with a guide rod according to a first embodiment of the present invention will now be described with reference to FIGS. 1 to 3.

Figure 1A:
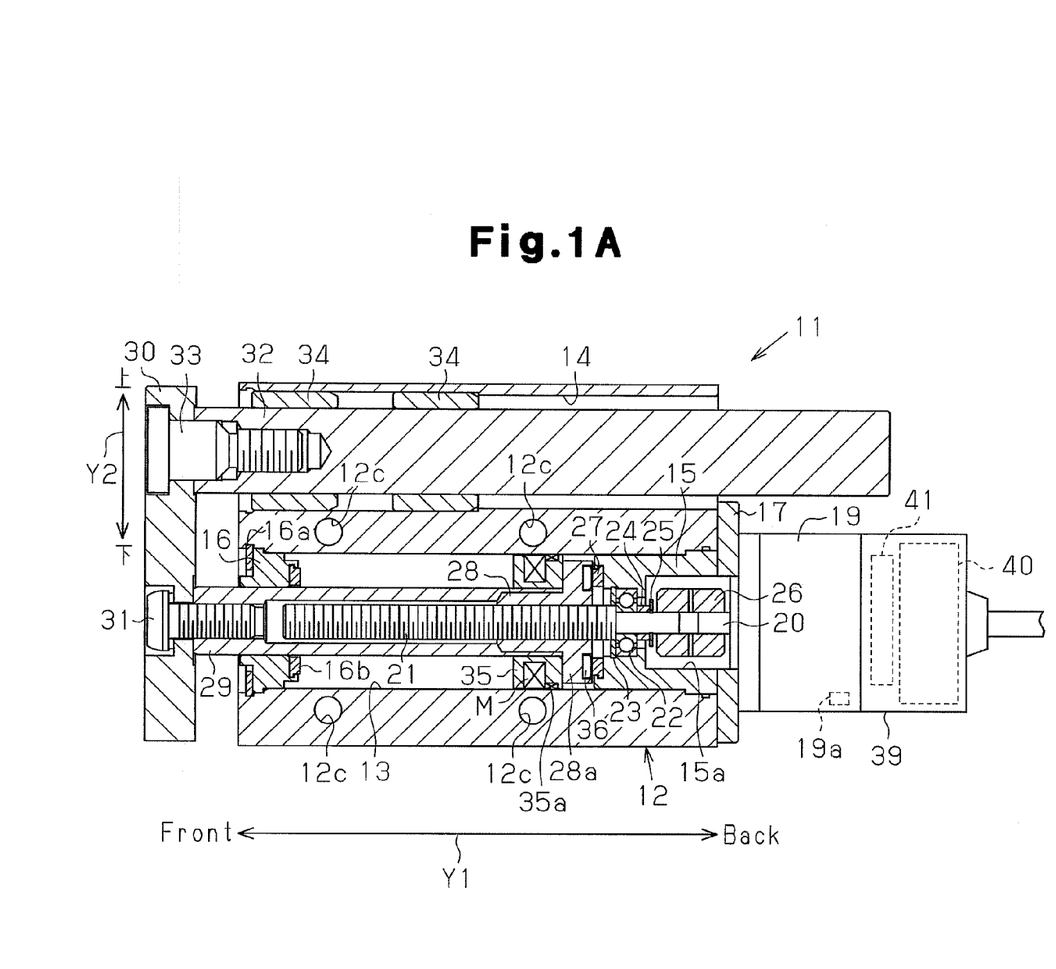
FIG. 1A is a cross-sectional side view illustrating an electric actuator according to a first embodiment.

Forward are rearward directions are defined as directions of arrow Y1 in FIG. 1A. Upward and downward directions are defined as directions of arrow Y2 in FIG. 1A. Leftward and rightward directions are defined as directions of arrow Y3 in FIG. 3.

As shown in FIG. 1A, the electric actuator 11 has a cylinder case 12. The cylinder case 12 is formed as a rectangular parallelepiped and has an accommodation hole 13 and an insertion hole 14, which extend along the longitudinal direction. A head cover 15 is fixed to the rear end of the accommodation hole 13, and a rod cover 16 is fixed to the front end of the accommodation hole 13. A C ring 16a prevents the rod cover 16 from falling off.

A motor mount plate 17 is fixed to the cylinder case 12 with bolts 18 (shown only in FIG. 1B), so as to cover the rear opening of the accommodation hole 13. The motor mount plate 17 also serves as a member for preventing the head cover 15 from falling off. A hole 15a is formed in the head cover 15. The motor mount plate 17 has a hole in a center that corresponds to the head cover hole 15a. A motor 19 is attached to the motor mount plate 17 with its rotary shaft 20 extending through the hole of the motor mount plate 17. The distal end of the rotary shaft 20 reaches the interior of the hole 15a. The motor 19 rotates both in forward and reverse directions.

A threaded shaft 21 is rotatably supported by the head cover 15 at its proximal end with a bearing 22. The threaded shaft 21 is a part of a ball screw, or a motion conversion mechanism that converts rotation of the rotary shaft 20 to linear motion. A C ring 23 is fixed in the head cover 15. The C ring 23 contacts the outer ring of the bearing 22. A spacer 24 and a C ring 25 are fixed to the threaded shaft 21. The spacer 24 and the C ring 25 contact the inner ring of the bearing 22. The proximal end of the threaded shaft 21 is coupled to the rotary shaft 20 with a coupling 26. A cushion member 27 is fixed to the front end of the head cover 15. Part of the cushion member 27 projects forward from the front end face of the head cover 15. The cushion member 27 is, for example, a rubber ring.

The ball screw, or the motion conversion mechanism, includes a ball nut 28. An output shaft 29, which is a movable body, is fixed to the ball nut 28. The output shaft 29 extends through the rod cover 16. The output shaft 29 is cylindrical and has a hole the diameter of which is larger than the outer diameter of the threaded shaft 21. The output shaft 29 is fitted to the front side of the ball nut 28 at the rear end of the hole. An end plate 30 is fixed to the front end of the output shaft 29 with a fastening bolt 31 at a position closer to one end. The guide rod 32, which extends through the insertion hole 14, is fixed to a portion of the end plate 30 near the other end with a fastening bolt 33. The guide rod 32 is supported by a bushing 34, so as to be movable in the front-rear direction in the insertion hole 14. The guide rod 32 prevents the end plate 30 from being rotated integrally with the output shaft 29. Thus, when the threaded shaft 21 is rotated by the motor 19, the output shaft 29 is linearly moved together with the ball nut 28. A cushion member 16b is fixed to the rear end of the rod cover 16. Part of the cushion member 16b projects rearward from the rear end face of the rod cover 16. The cushion member 16b is, for example, a rubber ring.

A ring member 35 is fitted to the proximal end of the output shaft 29. The ring member 35 is fixed to a flange portion 28a, which is formed at the proximal end of the ball nut 28 with a fastening screw 36. An annular groove is formed in the outer circumferential surface of the ring member 35. A permanent magnet M, which serves as a detection portion, and a wear ring 35a are fitted to the annular groove. That is, the permanent magnet M serving as a detection portion moves integrally with the output shaft 29. The outer diameter of the ring member 35 is smaller than the diameter of the accommodation hole 13, so that only the wear ring 35a slides on the accommodation hole 13.

Figure 1B:
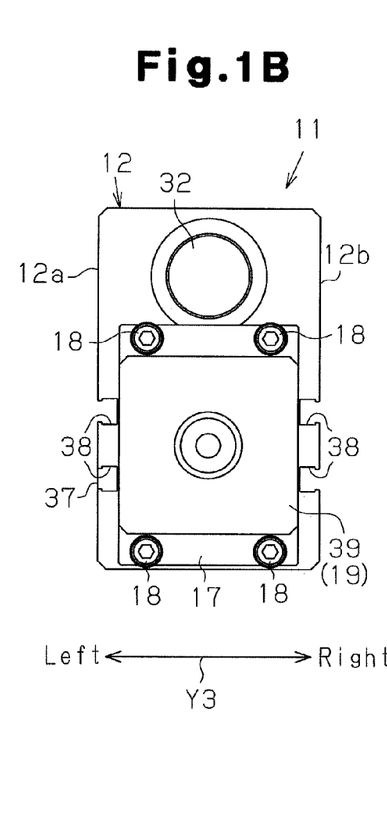
FIG. 1B is a rear view of the electric actuator shown in FIG. 1A.

As shown in FIG. 1B, a pair of attachment grooves 38 are formed in each of the left and right side surfaces 12a, 12b of the cylinder case 12, which functions as the main body of the electric actuator. The attachment grooves 38 are used for attaching a position detector 37, which detects the permanent magnet M. The attachment grooves 38 are formed parallel with the threaded shaft 21 and extend along the front-rear direction of the cylinder case 12. A position detector 37 is attached to one of the attachment grooves 38. The position detector 37 detects the permanent magnet M, which moves together with the output shaft 29, thereby detecting the position of the output shaft 29. The position detector 37 may be a position detecting device (position detection switch) that is used for detecting the piston position of a fluid pressure cylinder such as a pneumatic cylinder or a hydraulic cylinder and has a magnetic sensor. As shown in FIG. 1A, threaded holes 12c for fixing the electric actuator 11 to an automated machine are formed in the cylinder case 12.

A motor control portion 39 is attached to the rear end of the motor 19. The motor control portion 39 includes a control board 40 and a rotary encoder 41. The rotary encoder 41 functions as a rotation detector that detects rotation of the rotary shaft 20 of the motor 19. Also, a temperature sensor 19a (shown in FIG. 2) is provided in the motor 19.

Figure 2:
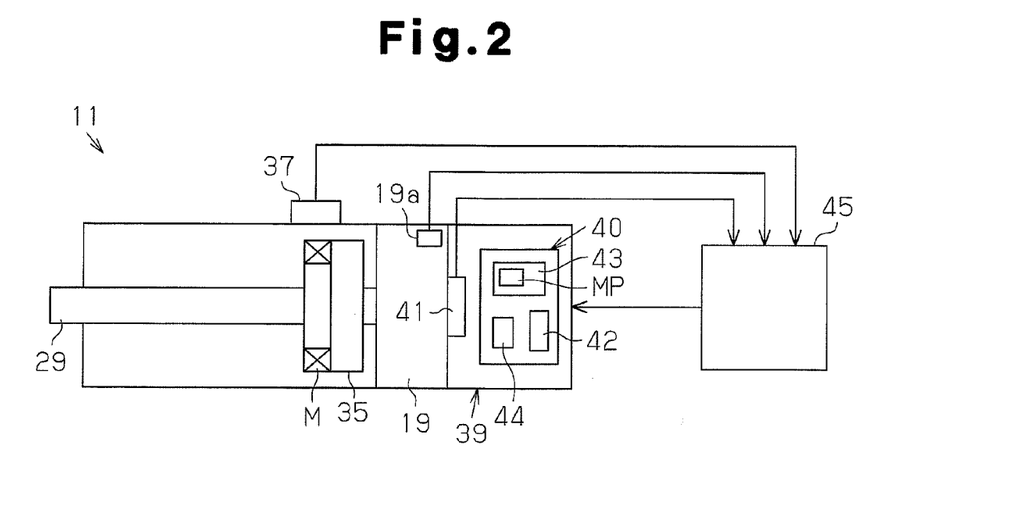
FIG. 2 is a diagram showing the relationship between the electric actuator, the position detector, and a host command unit.

As shown in FIG. 2, the control board 40 mounts a motor drive circuit 42, a motor control circuit 43 and a memory 44. The motor control circuit 43 includes a microprocessor MP that controls the motor drive circuit 42. The memory 44 stores control programs. The microprocessor MP controls the motor 19 through the motor drive circuit 42 based on command signals from a host command unit 45 such as a PC or PLC and detection signals of the rotary encoder 41.

The host command unit 45 detects whether the output shaft 29 is at a home position (reference position) based on a detection signal of the single position detector 37 attached to the electric actuator 11, and computes the displacement of the output shaft 29 from the reference position based on an output signal of the rotary encoder 41. The host command unit 45 then outputs a command signal to the microprocessor MP. In the present embodiment, the host command unit 45, the electric actuator 11, and the position detector 37 form an electric actuator control system.

Specifically, the host command unit 45 detects whether the output shaft 29 is at the home position based on a detection signal of the position detector 37, and computes the displacement of the output shaft 29 from the home position based on an output signal of the rotary encoder 41. Then, based on the position of the output shaft 29, the host command unit 45 outputs to the microprocessor MP a command signal similar to that used during the control of a pneumatic cylinder. The host command unit 45 also receives an output of the temperature sensor 19a to prevent the motor 19 from being excessively heated. When the detected temperature is higher than or equal to a predetermined temperature, the host command unit 45 determines that the temperature is abnormally high and outputs an emergency stop command to the microprocessor MP.

The electric actuator 11 has a plurality of input terminals and a plurality of output terminals. In the present embodiment, the electric actuator 11 has three input channels (input channel 1, input channel 2, input channel 3) for receiving command signals from the host command unit 45 when executing control at the fluid pressure cylinder mode. Also, the electric actuator 11 has two more input channels (input channel 4, input channel 5) for receiving signals for the emergency stop and return to the home position. The electric actuator 11 also includes an output terminal through which output signal of the rotary encoder 41 and the an alarm signal of an motor abnormality are sent to the host command unit 45. The following table 1 represents the relationship between corresponding types of electromagnetic valves and the function (command content) of a signal through the input channels from the host command unit 45 in the fluid pressure cylinder mode.

TABLE 1

| Mode | | Input Channel 1 | Input Channel 2 | Input Channel 3 | Input Channel 4 | Input Channel 5 |
|---|---|---|---|---|---|---|
| Transport Mode | Two-Position Single Solenoid | Advance (Continuous) | No Signal | Stop | Emergency Stop | Return to Home Position |
| | Two-Position Double Solenoid | Advance (Pulse) | Retreat (Pulse) | Stop | Emergency Stop | Return to Home Position |
| | Three-Position Double Solenoid | Advance (Continuous) | Retreat (Continuous) | Stop | Emergency Stop | Return to Home Position |
| Press Mode | Two-Position Single Solenoid | Advance (Continuous) | No Signal | Reduce Torque | Emergency Stop | Return to Home Position |
| | Two-Position Double Solenoid | Advance (Pulse) | Retreat (Pulse) | Reduce Torque | Emergency Stop | Return to Home Position |
| | Three-Position Double Solenoid | Advance (Continuous) | Retreat (Continuous) | Reduce Torque | Emergency Stop | Return to Home Position |

The control program includes, as control modes for controlling the motor 19, a fluid pressure cylinder mode (in the present embodiment, a pneumatic cylinder mode) and an electric motor mode. The fluid pressure cylinder mode refers to a control mode for causing, based on commands from the host command unit 45, the electric actuator 11 to perform actions that correspond to the actions of a fluid pressure cylinder being controlled through an electromagnetic valve. The fluid pressure cylinder mode includes a transport mode for moving an object to a predetermined position and a press mode for pressing an object with a predetermined force. In each of the transport mode and the press mode, the fluid pressure cylinder mode is divided into three modes each corresponding to one of the cases where a fluid pressure cylinder is controlled with a two-position single solenoid valve, a two-position double solenoid valve, and a three-position double solenoid valve. That is, the fluid pressure cylinder mode is divided into total of six different modes. The electric motor mode refers to a control mode in which a series of motions, which are programmed as in the case of the control of a conventional electric actuator, can be automatically executed based on detection signals of the rotary encoder 41. The execution is started based on a command from the host command unit 45.

As shown in table 1, in the case of the control mode corresponding to a two-position single solenoid valve, the microprocessor MP receives signals through input channels, or input channel 1, input channel 3, input channel 4, and input channel 5 from the host command unit 45, so that the output shaft 29 is advanced, retreated, stopped, emergency stopped, and returned to the home position. In the case of the control mode corresponding to either a two-position double solenoid valve or a three-position double solenoid valve, the microprocessor MP receives signals through five input channels, or input channel 1, input channel 2, input channel 3, input channel 4, and input channel 5 from the host command unit 45, so that the output shaft 29 is advanced, retreated, stopped, emergency stopped, and returned to the home position. The signal through input channel 3 is output from the host command unit 45 when the output shaft 29 reaches the forward end after moving forward and when the output shaft 29 reaches the proximal end after moving rearward.

Tables 2 and 3 show the relationship between signals through the input channels from the host command unit 45 and commands sent to the motor 19, the action of the motor 19, and the action of the output shaft 29.

TABLE 2

| | Signal Through Input Channel | Command to Motor | Action of Motor | Action of Output Shaft |
|---|---|---|---|---|
| Two-Position Single Solenoid Control | Signal Through Input Channel 1 ON | Start Forward Rotation | Start Forward Rotation | Advance |
| | Signal Through Input Channel 1 OFF | Start Reverse Rotation | Start Reverse Rotation | Retreat |
| | Signal Through Input Channel 3 ON | Stop Motor Rotation | Stop Rotation | Stop Moving |
| | Signal Through Input Channel 3 OFF | *** | | |
| | Emergency Stop Signal ON | Stop Motor Rotation | Stop Rotation | Stop Moving |
| | Emergency Stop Signal OFF | Start Forward Rotation When Input Channel 1 Is ON | Start Forward Rotation | Advance |
| | | Start Reverse Rotation when Input Channel 1 is OFF | Start Reverse Rotation | Retreat |
| | Return To Home Position Signal | Move To Home Position | Stop Rotation at Home Position after Starting Reverse Rotation | Stop After Reaching Home Position |
| Two-Position Double Solenoid | Signal through Input Channel 1 On | Start Forward Rotation | Start Forward Rotation | Advance |
| | Signal through Input Channel 1 OFF* | Continue Forward Rotation | Continue Forward Rotation | Advance |
| | Signal Through Input Channel 2 ON | Start Reverse Rotation | Start Reverse Rotation | Retreat |
| | Signal Through Input Channel 2 OFF** | Continue Reverse Rotation | Continue Reverse Rotation | Retreat |
| | Signal Through Input Channel 3 ON | Stop Motor Rotation | Stop Motor Rotation | Stop Moving |
| | Signal Through Input Channel 3 OFF | *** | | |
| | Emergency Stop ON | Stop Motor Rotation | Stop Rotation | Stop Moving |
| | Emergency Stop Signal OFF | Start Forward Rotation When Input Channel 1 Is ON | Start Forward Rotation | Advance |
| | | Start Reverse Rotation When Input Channel 2 is ON | Start Reverse Rotation | Retreat |
| | | Stop Motor Rotation when Input Channels 1, 2 are OFF | Stop Rotation | Stop Moving |
| | Return to Home Position Signal | Move to Home Position | Stop Rotation at Home Position after Starting Reverse Rotation | Stop after Reaching Home Position |

*After signal through input channel 1 is turned ON,
**After signal through input channel 2 is turned ON,
*** In accordance with signals through other input channels

TABLE 3

| | Signal through Input Channel | Command to Motor | Action of Motor | Action of Output Shaft |
|---|---|---|---|---|
| Three-Position Double Solenoid Control | Input Channel 1 On | Start Forward Rotation | Start Forward Rotation | Retreat |
| | Input Channel 1 OFF | Stop Motor Rotation | Stop Rotation | Stop Moving |
| | Input Channel 2 ON | Start Reverse Rotation | Start Reverse Rotation | Retreat |
| | Input Channel 2 OFF | Stop Motor Rotation | Stop Rotation | Stop Moving |
| | Input Channel 3 ON | Stop Motor Rotation | Stop Rotation | Stop Moving |
| | Input Channel 3 OFF | *** | | |
| | Emergency Stop ON | Stop Motor Rotation | Stop Rotation | Stop Moving |
| | Emergency Stop OFF | Start Forward Rotation when Input Channel 1 Is ON | Start Forward Rotation | Advance |
| | | Start Reverse Rotation when Input Channel 2 Is ON | Start Reverse Rotation | Retreat |
| | | Stop Motor Rotation when Input Channels 1, 2 Are OFF | Stop Rotation | Stop Moving |
| | Return to Home Position | Move to Home Position | Stop Rotation at Home Position After Starting Reverse Rotation | Stop after Reaching Home Position |

*** in accordance with other commands

The motor control circuit 43 is configured such that the control mode of the motor 19 can be set using a teaching box or a PC. The motor control circuit 43 is also configured such that control conditions for the transport mode and the press mode can be set using the teaching box or the PC. The control conditions include, in the transport mode, the moving velocity toward the projecting side (advancing side) of the output shaft 29, the acceleration toward the projecting side, the moving velocity toward the retracting side (retreating side), the acceleration and target moving distance toward the retreating side. Also, the control conditions include, in the press mode, the torque (thrust), the position at which the torque reduction starts, and a target moving distance. The target moving distance refers to a distance from the home position to the forward end when the electric actuator 11 is used.

When using the electric actuator 11 in the press mode, the forward rotation of the motor 19 is continued after the output shaft 29 reaches a target position and the end plate 30 contacts an object to be pressed, so that pressing force is applied to the object. At this time, if the motor 19 continues to be operated at the same torque (power) as when the output shaft 29 starts being moved, the temperature of the motor 19 will be excessively raised. Torque reduction starting position is a position at which the power of the motor 19 is reduced compared to that when the motor 19 starts operating, so the torque is reduced.

In the press mode, when determining that the output shaft 29 has reached the torque reduction start position based on an output signal from the rotary encoder 41, the host command unit 45 outputs an ON signal through the input channel 3. In the press mode, when the signal through the input channel 3 is turned ON while the output shaft 29 is being advanced, the microprocessor MP drives the motor 19 at low torque and power. That is, the function of the input channel 3 in the transport mode is different from that in the press mode. In the transport mode, an ON signal through the input channel 3 functions as a stop command. In the press mode, an ON signal through the input channel 3 functions as a torque reduction command.

Next, a description will be given of a case where the above described electric actuator 11 is installed and used in an automated machine. After installing the electric actuator 11 in a predetermined position in the automated machine, the operator selects a control mode by means of which the microprocessor MP controls the motor 19 in accordance with the intended use, sets parameters needed to execute the selected control mode, and installs the position detector 37.

Figure 3:
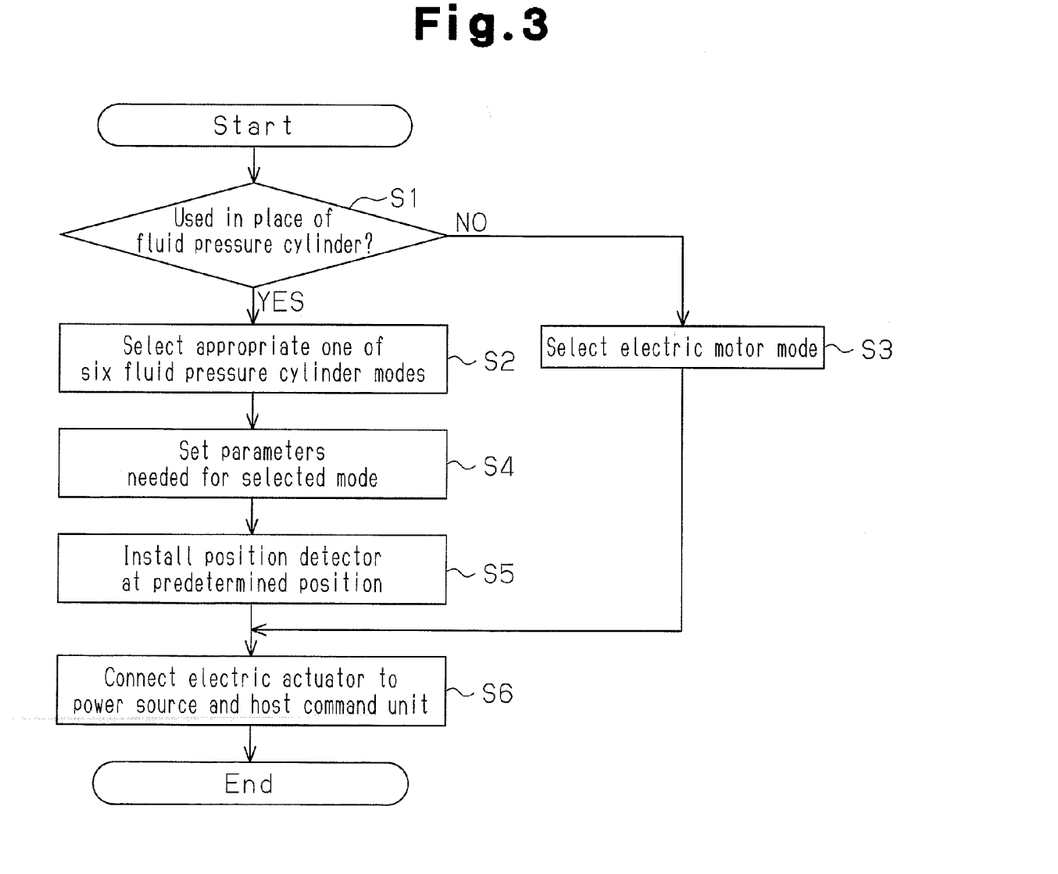
FIG. 3 is a flowchart showing a procedure of the preparation of the use of the electric actuator.

Specifically, the operator performs the preparation for using the electric actuator 11 in accordance with the procedure shown in the flowchart of FIG. 3. The operator first determines whether the electric actuator 11 is used in place of a fluid pressure cylinder at step S1. When the electric actuator 11 is used in place of a fluid pressure cylinder, the operator proceeds to step S2. When the electric actuator 11 is not used in place of a fluid pressure cylinder, but used in the same manner as a normal electric actuator, the operator proceeds to step S3.

At step S2, the operator selects an appropriate one of the six fluid pressure cylinder modes, and then proceeds to step S4. At step S4, the operator sets parameters required for executing the selected control mode. Selection of the control mode and setting of parameters are executed through a PC or a teaching box connected to the motor control portion 39. Then, the operator proceeds to step S5, and installs the position detector 37 in an attachment groove 38 such that the position detector 37 detects the permanent magnet M when the output shaft 29 is at the home position. The operator subsequently proceeds to step S6 and completes the preparation by connecting the electric actuator 11 to a power source and the host command unit 45.

When using the electric actuator 11 as a normal electric actuator, the operator selects the electric motor mode at step S3 and proceeds to step S6. That is, when using the electric actuator 11 as a normal electric actuator, the operator sets the control mode of the microprocessor MP to the electric motor mode. Unlike the case where the operator selects the fluid cylinder mode, the operator does not need to set parameters or install the position detector 37.

In the case where the electric motor mode is selected, when the electric actuator 11 receives a drive command signal from the host command unit 45, the microprocessor MP automatically performs a series of operations in accordance with the control program. At this time, the microprocessor MP computes the position of the output shaft 29 from the output signal of the rotary encoder 41, and controls the motor 19 according to the control program, thereby moving the output shaft 29 to a predetermined position.

In the case where the fluid pressure cylinder mode is selected, when the electric actuator 11 receives a drive command signal from the host command unit 45, the microprocessor MP controls the motor 19 in accordance with the control program of the selected control mode. The microprocessor MP is capable of receiving signals through five input channels, or the input channels 1 to 5, from the host command unit 45. In accordance with an input signal, the microprocessor MP controls the motor 19 such that the motor operates in a manner that corresponds to the selected mode in the tables 2 and 3.

A description will now be given of the transport mode. In the two-position single solenoid valve mode, signals are received through four types input channels, or the input channel 1, the input channel 3, the input channel 4, and the input channel 5. When the signal through the input channel 1 is ON, the motor 19 starts rotating forward. While the signal through the input channel 1 is ON, the output shaft 29 continues to advance. When the output shaft 29 reaches the forward end, an ON signal is supplied through the input channel 3, so that the rotation of the motor 19 is stopped. This stops the movement of the output shaft 29. Then, when the signals through the input channel 3 and the input channel 1 are both turned OFF, the motor 19 starts reverse rotation. While the signal through the input channel 1 is OFF, the output shaft 29 continues to retreat. When the output shaft 29 reaches the home position, the signal through the input channel 3 is turned ON, so that the rotation of the motor 19 is stopped. Accordingly, the movement of the output shaft 29 is stopped.

While the motor 19 is rotating, if a signal through the input channel 4, or an emergency stop signal, is turned ON, the motor 19 is stopped, so that the output shaft 29 is stopped. After the signal through the input channel 4 is turned OFF, the motor 19 starts forward rotation when the signal through the input channel 1 is turned ON, so that the output shaft 29 starts advancing. If the signal through input channel 1 is OFF when the signal through the input channel 4 is turned OFF, the motor 19 starts reverse rotation, so that the output shaft 29 starts retreating. When the signal through the input channel 5, or the home position return command signal, is turned ON, the motor 19 starts reverse rotation and then stops the rotation at the home position. That is, the output shaft 29 moves to the home position and stops there regardless of the position at which the signal through the input channel 5 is turned ON.

In the two-position double solenoid valve mode, signals are supplied through five input channels, or the input channels 1 to 5. Signals through the input channel 1 and the input channel 2 are supplied as pulse signals. When the signal through the input channel 1 is turned ON, the motor 19 starts forward rotation on the leading edge of the signal through the input channel 1, so that the output shaft 29 advances. The motor 19 continues the forward rotation after the input channel 1 is turned OFF, and the output shaft 29 continues advancing. When the output shaft 29 reaches the forward end, an ON signal is supplied through the input channel 3, so that the rotation of the motor 19 is stopped. This stops the movement of the output shaft 29. Then, when the signals through the input channel 3 and input channel 2 are both turned ON, the motor 19 starts reverse rotation on the leading edges of the signals through the input channels 3 and 2, and the output shaft 29 retreats. The motor 19 continues the reverse rotation after the signal through the input channel 2 is turned OFF, and the output shaft 29 continues retreating. When the output shaft 29 reaches the home position, the signal through the input channel 3 is turned ON, so that the rotation of the motor 19 is stopped. Accordingly, the movement of the output shaft 29 is stopped.

While the motor 19 is rotating, if the signal through the input channel 4, or an emergency stop signal, is turned ON, the motor 19 stops the rotation, so that the output shaft 29 is stopped. After the signal through the input channel 4 is turned OFF, the motor 19 starts forward rotation when the signal through the input channel 1 is turned ON, so that the output shaft 29 advances. If the signal through the input channel 2 is ON when the signal through the input channel 4 is turned OFF, the motor 19 starts reverse rotation, so that the output shaft 29 retreats. Also, if the signals through the input channels 1 and 2 are OFF when the signal through input channel 4 is turned OFF, the motor 19 remains stopped, so that the output shaft 29 remains stopped. When the signal through the input channel 5, or the home position return command signal, is turned ON, the motor 19 starts reverse rotation and then stops the rotation at the home position. That is, the output shaft 29 moves to the home position and stops there regardless of the position at which the signal through the input channel 5 is turned ON.

In the three-position double solenoid valve mode, signals are supplied through five input channels, or the input channels 1 to 5. After the signal through the input channel 1 is turned ON, the motor 19 starts forward rotation, so that the output shaft 29 advances. The motor 19 stops the rotation when the signal through the input channel 1 is turned OFF, and the output shaft 29 stops the operation. When the output shaft 29 reaches the forward end, an ON signal is supplied through the input channel 3, so that the rotation of the motor 19 is stopped. This stops the movement of the output shaft 29. Then, when the signals through the input channels 1 and 3 are turned OFF and the signal through the input channel 2 is turned ON, the motor 19 starts reverse rotation, so that output shaft 29 retreats. The motor 19 stops the rotation when the signal through the input channel 2 is turned OFF, and the output shaft 29 stops the operation. When the output shaft 29 reaches the home position, an ON signal is supplied through the input channel 3, so that the rotation of the motor 19 is stopped. This stops the movement of the output shaft 29.

If the signal through the input channel 4, or an emergency stop signal, is turned ON, the motor 19 stops the rotation, so that the output shaft 29 is stopped. After the signal through the input channel 4 is turned OFF, the motor 19 starts forward rotation when the signal through the input channel 1 is turned ON, so that the output shaft 29 advances. If the signal through the input channel 2 is ON when the signal through the input channel 4 is turned OFF, the motor 19 starts reverse rotation, so that the output shaft 29 retreats. Also, if the signals through the input channels 1 and 2 are OFF when the signal through input channel 4 is turned OFF, the motor 19 remains stopped, so that the output shaft 29 remains stopped. When the signal through the input channel 5, or the home position return command signal, is turned ON, the motor 19 starts reverse rotation and then stops the rotation at the home position. That is, the output shaft 29 moves to the home position and stops there regardless of the position at which the signal through the input channel 5 is turned ON.

On the other hand, in the case of the press mode, control is performed in which the torque of the motor 19 is reduced by a predetermined ratio from when the output shaft 29 reaches the torque reduction position while the output shaft 29 moves forward in the transport mode. After the output shaft 29 reaches the forward end, the motor 19 continues to be driven, so that the end plate 30 performs pressing.

In the two-position single solenoid valve mode, when the signal through the input channel 1 is turned OFF during the pressing state, the motor 19 starts reverse rotation, so that the output shaft 29 retreats. Accordingly, the pressing by the end plate 30 is cancelled.

In the two-position double solenoid valve mode, if the signal through the input channel 2 is turned ON during the pressing state, the motor 19 starts reverse rotation. Thereafter, the reverse rotation of the motor 19 is continued even if the signal through the input channel 2 is turned OFF. Thus, after the output shaft 29 retreats and the pressing of the end plate 30 is cancelled, the output shaft 29 is returned to the home position.

In the three-position double solenoid valve mode, when the signal through the input channel 2 is turned ON during the pressing state, the motor 19 starts reverse rotation, so that the output shaft 29 retreats. Accordingly, the pressing by the end plate 30 is cancelled.

The present embodiment provides the following advantages.

(1) The electric actuator 11 includes a motion conversion mechanism (ball screw), which converts rotation of the rotary shaft 20 of the motor 19 into linear motion of the output shaft 29, a detection signal of the position detector 37 for detecting the detection portion (permanent magnet M) moving integrally with the output shaft 29, and the motor control portion 39, which controls the motor 19 based on commands from the host command unit 45. The motor control portion 39 has the memory 44, which stores control programs for controlling the motor 19. As a control mode for controlling the motor 19, the control program has a fluid pressure cylinder mode, in which the motor 19 is controlled at an operation mode that corresponds to the case where a fluid pressure cylinder is controlled with an electromagnetic valve. The motor control circuit 43 controls the actuation and stopping of the output shaft 29 at the fluid pressure cylinder mode. Therefore, by connecting the electric actuator 11 to the host command unit 45 having a program for controlling a fluid pressure cylinder, the electric actuator 11 can be controlled using the control program of the host command unit 45, which is originally designed to control fluid pressure cylinders. Thus, compared to conventional electric actuators, replacement with a fluid pressure cylinder is easily performed. Also, a person who is not familiar with control of electric motors can handle such replacement.

(2) As the fluid pressure cylinder mode, the control program has six modes each corresponding to one of the cases where a fluid pressure cylinder is controlled with three types of electromagnetic valves, that is, a two-position single solenoid valve, a two-position double solenoid valve, and a three-position double solenoid valve in the transport mode and the press mode. The motor 19 is controlled according to the selected control mode. Thus, by selecting a desired control mode among the fluid pressure cylinder modes and using the selected mode, the electric actuator 11 can be controlled by using a control program of the host command unit 45, which is originally designed to control a fluid pressure cylinder. Thus, compared to conventional electric actuators, replacement with a fluid pressure cylinder is easily performed. Also, a person who is not familiar with control of electric motors can handle such replacement.

(3) Attaching portions (attachment grooves 38) are formed in the side surfaces 12a, 12b of the cylinder case 12, and the position detector 37 for detecting a detection portion (the permanent magnet M) moving integrally with the output shaft 29 is attached to one attaching portion. Therefore, the same position detector used in a fluid pressure cylinder can be used as the position detector 37 and can be installed in a predetermined position through the same manner. Thus, the specification of the position detector does not need to be changed, and the number of installing steps and the number of spare articles can be reduced. The structure and the output type of the position detector 37 can be selected in accordance with the type of the host command unit 45 and the use environment of the electric actuator 11. Also, when the position detector 37 fails, only the position detector 37 can be replaced. Contrastingly, in a conventional electric actuator, which detects the position of the output shaft 29 only by using a rotary encoder, the output type is limited and the rotary encoder is difficult to be replaced when it fails.

(4) The electric actuator 11 includes a rotation detector (the rotary encoder 41) for detecting rotation of the rotary shaft 20 of the motor 19, and the control program has the electric motor mode for controlling the motor 19 based on command signals from the host command unit 45 and detection signals of the rotary encoder 41. The motor 19 is then controlled at the selected one of the fluid pressure cylinder mode and the electric motor mode. Thus, the electric actuator 11 can be controlled not only at the control mode of a fluid pressure cylinder, but also at the control mode of a conventional electric actuator. This adds to the flexibility of the operation of the electric actuator 11.

(5) When the temperature of the motor 19, which is represented by a detection signal of the temperature sensor 19a located in the motor 19, is higher than or equal to a predetermined temperature, the host command unit 45 outputs an emergency stop command to the microprocessor MP. Therefore, the motor 19 is prevented from being excessively heated due to continuous operation of the electric actuator 11 under an abnormal state.

(6) When the motor 19 is controlled at the transport mode, the microprocessor MP is capable of changing the moving velocity toward the projecting side of the output shaft 29 the acceleration toward the projecting side, the moving velocity toward the retracting side, the acceleration and target moving distance toward the retreating side. When the motor 19 is controlled at the press mode, the microprocessor MP is capable of changing the thrust (torque), the position at which the torque is reduced, and the target moving distance. Therefore, unlike a fluid pressure cylinder, in which the moving velocity and acceleration of the piston rod are controlled using a speed controller, these of the output shaft 29 are easily changed by altering the control conditions of the motor 19.

(7) Since the electric actuator 11 has the guide rod 32, the output shaft 29 is permitted to reciprocate while being inhibited from chattering. Also, the guide rod 32 functions as a rotation preventing portion for the ball nut 28, to which the output shaft 29 is fixed. This eliminates the necessity for a dedicated rotation preventing portion.

(8) Even when the electric actuator 11 is controlled at the fluid pressure cylinder mode, the host command unit 45 can determine that the output shaft 29 has reached the forward end based on a detection signal of the rotary encoder 41. Therefore, only one position detector 37, which is used for determining the home position, is necessary.

(9) When a fluid pressure cylinder is used, there is a demand for stopping the piston rod at the current position regardless of the type of the control valve. Also, there is a demand for actuating the piston rod after returning the piston rod to the home position after the emergency stop. When controlled at the fluid pressure cylinder mode, the electric actuator 11 is controlled such that the output shaft 29 is returned to the home position regardless of the fluid pressure cylinder mode when the home position return command is sent from the host command unit 45. Therefore, the present invention facilitates the returning to the home position, which can be difficult depending on the used electromagnetic valve in the control of a fluid pressure cylinder.

Second Embodiment

A second embodiment will now be described with reference to FIG. 4. This embodiment is significantly different from the first embodiment in that an output portion of an electric actuator 11 is incorporated in a pressure control valve. Like or the same reference numerals are given to those components that are like or the same as the corresponding components of the first embodiment, and the explanations thereof are omitted.

The electric actuator 11 includes an electric actuator portion 46 and a pressure control valve portion 47. A cylinder case 12, which forms the electric actuator portion 46, is formed to be cylindrical.

The threaded shaft 21 is located in a center portion of the cylinder case 12. A movable body 48 is fixed to the distal end of the ball nut 28. The movable body 48 is formed as a cylinder with a bottom and a flange portion 48a. The outer circumferential surface of the flange portion 48a is prevented from rotating along the inner circumferential surface of the cylinder case 12, while being slidable along the direction of the linear motion.

A valve unit 49 of the pressure control valve portion 47 is fixed to an end of the cylinder case 12. A passage 50 through which fluid, or air, flows is formed in the valve unit 49. A primary port 51 is formed at the upstream end of the passage 50. The primary port 51 opens to a side surface of the valve unit 49. A secondary port 52 is formed at the downstream end of the passage 50. The secondary port 52 opens to a side surface of the valve unit 49. Air (fluid) of a primary pressure flows into the primary port 51, while air of a secondary pressure is discharged from the secondary port 52.

Also, a first valve hole 53 is formed in the valve unit 49. The first valve hole 53 forms a part of the passage 50 and connects the primary port (inlet port) 51 and the secondary port (outlet port) 52 to each other. In the valve unit 49, a first valve seat 54 is formed around the first valve hole 53. A first chamber 55 is formed in a lower portion of the valve unit 49. A first valve body 56, which contacts and separates from the first valve seat 54, is located in the first chamber 55. An opening of the first chamber 55 at a side opposite to the first valve hole 53 is covered by a lid 57. A coil spring 58 is placed between the first valve body 56 and the lid 57, and urges the first valve body 56 in the closing direction. Small holes 56a are formed in the first valve body 56 at positions displaced from the center.

A second chamber 60 is formed above the first chamber 55. The second chamber 60 can be connected to the passage 50 through a second valve hole 59. A second valve seat 61 is formed around the second valve hole 59 in the second chamber 60. Also, a second valve body 62, which contacts and separates from the second valve seat 61, is provided in the second chamber 60. A stopper 63 is fitted in an upper portion of the second chamber 60. A coil spring 64 is placed between the stopper 63 and the second valve body 62, and urges the second valve body 62 in the closing direction. Small holes 62a are formed in the second valve body 62 at positions displaced from the center.

A third chamber 65 is formed above the second chamber 60. A piston 66 is accommodated in the third chamber 65. A piston rod 67 of the piston 66 extends through the second valve body 62 into the passage 50. The third chamber 65 communicates with a discharge port (not shown). The length of the piston rod 67 is determined such that, when the piston 66 moves downward, the piston rod 67 engages with the first valve body 56, and moves the first valve body 56 downward against the force of the coil spring 58. The piston rod 67 has a large diameter portion 67a located below the second valve body 62. As shown in FIG. 4, when the first valve body 56 and the second valve body 62 are at the closing positions, the large diameter portion 67a contacts the lower surface of the second valve body 62.

Figure 4:
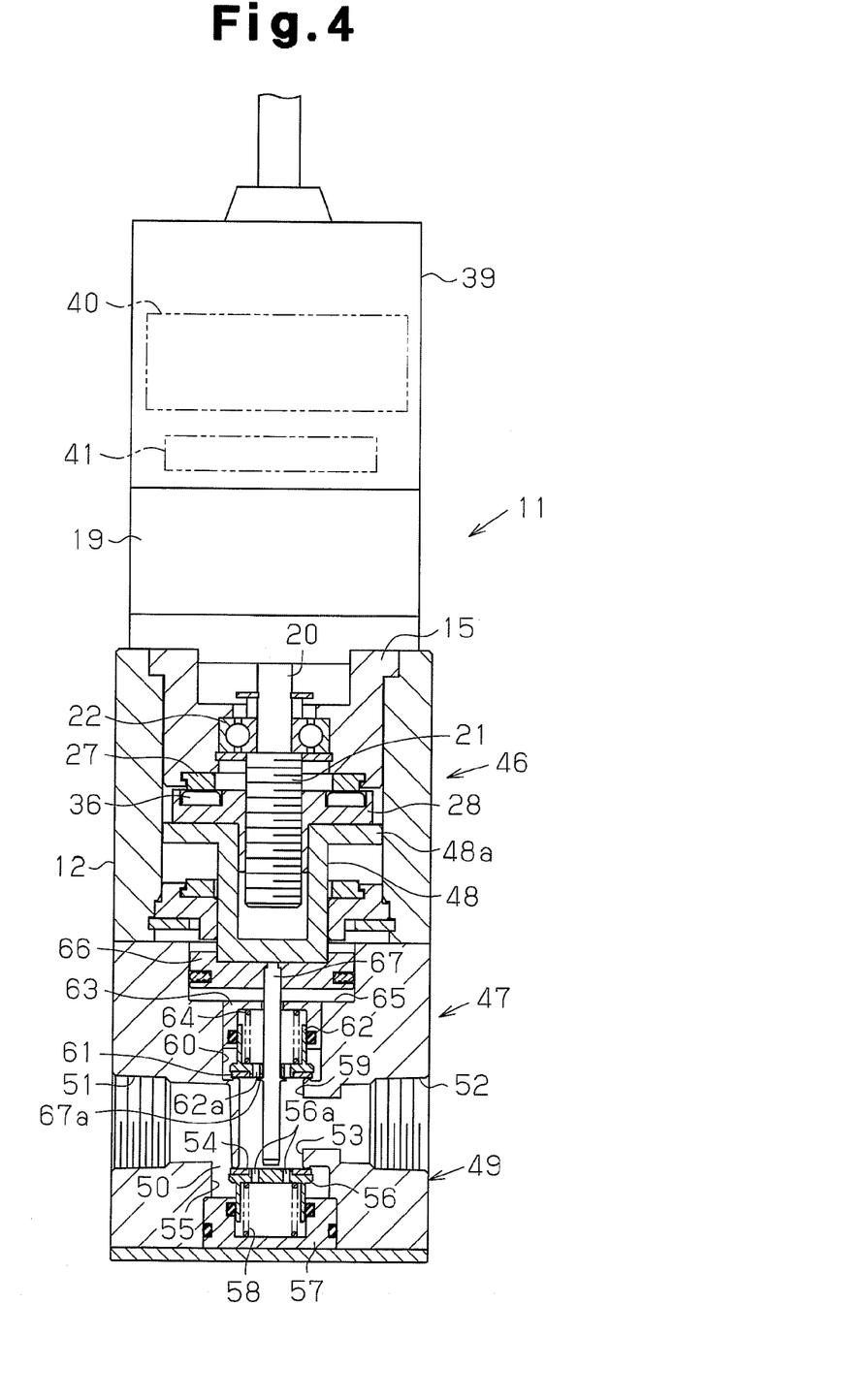
FIG. 4 is a cross-sectional side view illustrating an electric actuator according to a second embodiment.

Therefore, when the piston 66 is moved downward from the state shown in FIG. 4, the piston rod 67 is moved downward together with the piston 66. The distal end of the piston rod 67 then contacts the first valve body 56 and pushes the first valve body 56 downward against the force of the coil spring 58. The first valve body 56 thus opens the first valve hole 53. In this state, pressure air supplied through the primary port 51 is supplied to the secondary port 52 through the first valve hole 53. The pressure air is then supplied to a predetermined position (device) from the secondary port 52.

When the piston 66 is moved upward from the opening state of the first valve body 56, the piston rod 67 is also moved upward, so that the first valve body 56 closes the first valve hole 53. When the piston 66 is moved upward from the closing state of the first valve body 56, the large diameter portion 67a engages with the second valve body 62 to be in the state shown in FIG. 4. If the piston 66 is moved further upward from this state, the second valve body 62 is moved upward together with the piston rod 67 while engaging with the large diameter portion 67a, so that the second valve body 62 opens the second valve hole 59. In this state, pressure air in the secondary port 52 is discharged to the atmosphere through the discharge port.

The opening degree of the first valve body 56 and the second valve body 62 is determined by the displacement of the piston 66 from a reference position. The opening and closing speed of the first valve body 56 and the second valve body 62 is determined by the moving velocity of the piston 66. In this embodiment, the motor control circuit 43 detects the displacement of the piston 66 based on an output signal of the rotary encoder 41, and performs control based on the detection result.

The embodiment is not limited to the above, but may be modified as follows, for example.

Instead of determining that there is an abnormality when the temperature of the motor 19 is higher than or equal to a predetermined temperature and outputting an emergency stop command, the host command unit 45 may determine whether there is an abnormality based on the moving velocity of the output shaft 29. For example, the host command unit 45 may compute the position of the output shaft 29 based on an output signal of the rotary encoder 41, and compute the moving velocity of the output shaft 29 based on changes of the position over time. In this case, if the difference between the computed velocity and a predetermined velocity is greater than a predetermined value, the host command unit 45 determines that there is an abnormality, and outputs an emergency stop command to the microprocessor MP. In this case also, the electric actuator 11 is prevented from operating for an extended period of time in an abnormal state.

It may be configured that, when the motor 19 is controlled at the fluid pressure cylinder mode, the host command unit 45 computes the moving velocity of the output shaft 29 based on an output signal of the rotary encoder 41, but does not determine whether there is an abnormality based on the value of the moving velocity. In this case, only the control similar to that of a general fluid pressure cylinder is possible, and emergency stopping accompanying the determination of abnormality based on the moving velocity of the output shaft 29 is not performed.

In the configuration with the rotary encoder 41, when the motor 19 is controlled at the fluid pressure cylinder mode, the position detector 37 may be omitted. In this case, the host command unit 45 determines the home position and the forward end position of the output shaft 29 based on a detection signal of the rotary encoder 41. In this case, the host command unit 45 and the electric actuator 11 form an electric actuator control system.

The electric actuator 11 does not need to include the rotary encoder 41, and it may be configured that the microprocessor MP controls the motor 19 only at the fluid pressure cylinder mode, but not at the electric motor mode. In this case, the position of the output shaft 29 is only indicated by signals from the position detector 37. Thus, two position detectors 37 need to be used for determining the home position and the forward end position of the output shaft 29, respectively.

Even in the case where the electric actuator 11 has the rotary encoder 41, the position detector 37 may be attached to the attachment grooves 38 at each of the home position and the forward end position. In this case, the home position and the forward end position are determined based on detection signals of the position detectors 37.

In the case where the electric actuator 11 has no rotary encoder 41 and can be controlled only at the fluid pressure cylinder mode, the host command unit 45 may determine whether there is an abnormality based on the elapsed time from when the output shaft 29 starts moving, and output an emergency stop signal. For example, it may be determined that there is an abnormality when the output shaft 29 does not reach the forward end (projection completion position) within a predetermined period from the starting of movement of the output shaft 29 and no position detection signal is output from the position detector 37.

In the case where the electric actuator 11 has no rotary encoder 41, it may be configured that the host command unit 45 does not determine whether there is an abnormality in the movement of the output shaft 29. In this case, the output shaft 29 of the electric actuator 11 is moved in the same manner as the piston rod of a fluid pressure cylinder of the selected fluid pressure cylinder mode, and emergency stopping is not executed.

In the case where the motor 19 is controlled at the fluid pressure cylinder, the returning of the output shaft 29 to the home position may be executed by using a signal through an input channel other than the input channel 5 for returning to the home position, depending on the control mode. For example, in the two-position single solenoid valve mode, the host command unit 45 may turn the signal through input channel 1 OFF, instead of turning the signal through the input channel 5 for returning to the home position, when the output shaft 29 is being advanced.

In the case where the motor 19 is controlled at the fluid pressure cylinder mode, the moving velocity and acceleration of the output shaft 29 toward the projecting side and the retracting side do not need to be adjustable. That is, the moving velocities and the accelerations may be fixed to predetermined values. In this case, the procedures for setting the velocities and accelerations are unnecessary.

Two attachment grooves 38 do not need to be formed on each of the side surfaces 12a, 12b of the cylinder case 12. One attachment groove 38 may be formed on each of the side surfaces 12a, 12b. In this case, if two position detectors 37 are required, they are attached to one attachment groove 38. Alternatively, the attachment groove 38 may be formed on one of he side surfaces 12a, 12b. However, forming the attachment groove 38 on each of the side surfaces 12a, 12b adds to more flexibility of the installment of the electric actuator 11 in an automated machine.

The electric actuator 11 may be a type that has no guide rod 32. In this case, for example, splines are formed on the outer circumferential surface of the flange portion 28a of the ball nut 28, and projections that engage with the splines to restrict rotation of the ball nut 28 are formed in the inner surface of the cylinder case 12. The splines and projections are formed to be parallel to the threaded shaft 21.

As long as the motor 19 rotates both in forward and reverse directions, it may be either an alternate current motor or a direct current motor.

The memory 44 may store a number of combinations of the moving velocity toward the projecting side of the output shaft 29, the acceleration toward the projecting side, the moving velocity toward the retracting side, the acceleration and target moving distance toward the retreating side in the transport mode of the motor 19. The memory 44 may also store a number of combinations of the thrust (torque) and the position at which the torque is reduced in the press mode of the motor 19. An appropriate combination is selected from these values. In this case, the setting of parameters is easier than the case where the value of the parameters are individually set.

A ball screw mechanism may be used as the motion conversion mechanism. In this case, a table or block that moves together with a ball nut is used as a movable body, and an electric actuator is used for controlling the movement of the movable body.

In an electric actuator 11 having a pressure control valve portion 47 as in the second embodiment, the pressure control valve portion 47 may be a type that is incapable of adjusting the opening degree, that is, a type in which the first valve body 56 and the second valve body 62 are switched between fully open state and fully closed state.

In the case where the electric actuator is installed in a control valve, a pressure sensor or a flow rate sensor may be provided in an outlet portion of the control valve. In this case, output of the sensor is used as a motor control signal so that the output pressure and the output flow rate of the control valve are highly accurately feedback controlled.

The fluid pressure cylinder does not need to be a pneumatic cylinder. That is, the present invention may be applied to a cylinder that uses gas other than air or a cylinder that uses liquid as fluid. For example, the present invention may be applied to a hydraulic cylinder.

In this specification, movable body refers to an output shaft that is driven by the motion conversion mechanism and an object that moves integrally with a ball nut in the case where the motion conversion mechanism is a ball screw mechanism.

Therefore, the present examples and embodiments are to be considered as illustrative and not restrictive and the invention is not to be limited to the details given herein, but may be modified within the scope and equivalence of the appended claims.

The invention claimed is:

1. An electric actuator that has a main body and can be used in place of a fluid pressure cylinder that is a part of an automated machine and has a piston rod, reciprocation of which is controlled through an electromagnetic valve, the electric actuator comprising:
   a movable body that can be moved linearly, the movable body corresponding to the piston rod of the fluid pressure cylinder;
   a motor having a rotary shaft;
   a motion conversion mechanism that converts rotation of the rotary shaft of the motor to linear motion of the movable body;
   a motor control circuit that controls the motor; and
   a memory that stores a control program for controlling the motor control circuit,
   wherein the control program has, as a control mode for controlling the motor, a fluid pressure cylinder mode, in which the electric actuator actuates the movable body in a manner corresponding to the manner in which the piston rod is actuated when the fluid pressure cylinder is controlled through the electromagnetic valve, and wherein the motor control circuit controls the actuation and stopping of the movable body in the fluid pressure cylinder mode.

2. The electric actuator according to claim 1, wherein the movable body has a detection portion that moves integrally with the movable body, and wherein the main body of the electric actuator has an attaching portion to which a position detector for detecting the detection portion is attached.

3. The electric actuator according to claim 1, wherein the fluid pressure cylinder mode of the control program is divided into total of six different modes including a transport mode for moving an object and a press mode for applying pressing force to an object to hold it, each of the transport mode and the press mode being divided into three modes each corresponding to one of a case where a fluid pressure cylinder is controlled with a two-position single solenoid valve, a case where a two-position double solenoid valve, and a case where a three-position double solenoid valve, and wherein the motor control circuit controls the motor in a selected one of the six modes.

4. The electric actuator according to claim 3, wherein, when controlling the motor in the transport mode, the motor control circuit is capable of changing the moving velocity, the acceleration, and a target moving distance of the movable body, and wherein, when controlling the motor in the press mode, the motor control circuit is capable of changing the torque, the position at which torque reduction starts, and a target moving distance.

5. The electric actuator according to claim 1, further comprising a rotation detector that detects rotation of the rotary shaft of the motor, wherein the control program further has an electric motor mode, in which the motor is controlled based on a command signal from a host command unit and a detection signal of the rotation detector, and wherein the motor control circuit controls the motor in a selected one of the fluid pressure cylinder mode and the electric motor mode.

6. The electric actuator according to claim 1, wherein the control program is configured to control the motor such that, when the motor is being controlled in the fluid pressure cylinder mode, the motor is stopped and returns the movable body to a home position based on an emergency stop command and a home position return command from a host command unit.

7. The electric actuator according to claim 1, wherein the movable body is installed in a control valve that selectively stops and allows flow of fluid, wherein the motor control circuit is capable of changing the opening and closing speed of the control valve.

8. The electric actuator according to claim 1, wherein the movable body is installed in a control valve that controls the flow rate or the pressure of fluid.

9. An electric actuator control system, comprising:
   the electric actuator according to claim 5;
   a position detector attached to the electric actuator; and
   a host command unit electrically connected to the electric actuator and to the position detector,
   wherein the host command unit determines whether there is an abnormality in the electric actuator based on an output signal of the rotation detector, and wherein the control program is configured to control the motor such that, when the motor is being controlled in the fluid pressure cylinder mode, the motor is stopped and returns the movable body to a home position based on an emergency stop command and a home position return command from the host command unit.

10. An electric actuator control system comprising the electric actuator according to claim 1, and a host command unit that outputs a control signal to the electric actuator based on a control program for controlling a fluid pressure cylinder.

* * * * *

UNITED STATES PATENT AND TRADEMARK OFFICE
CERTIFICATE OF CORRECTION

PATENT NO. : 7,969,109 B2
APPLICATION NO. : 12/336152
DATED : June 28, 2011
INVENTOR(S) : Shuzo Masuo et al.

It is certified that error appears in the above-identified patent and that said Letters Patent is hereby corrected as shown below:

Col. 8, line 12, please delete the word "the" which occurs after the word "and".
Col. 20, line 17, please delete "he" and insert therefor --the--.

Signed and Sealed this
Ninth Day of August, 2011

David J. Kappos
*Director of the United States Patent and Trademark Office*